No. 730,953. PATENTED JUNE 16, 1903.
F. McCALL.
SAFETY DEVICE FOR BATH TUBS.
APPLICATION FILED JULY 17, 1902.
NO MODEL.
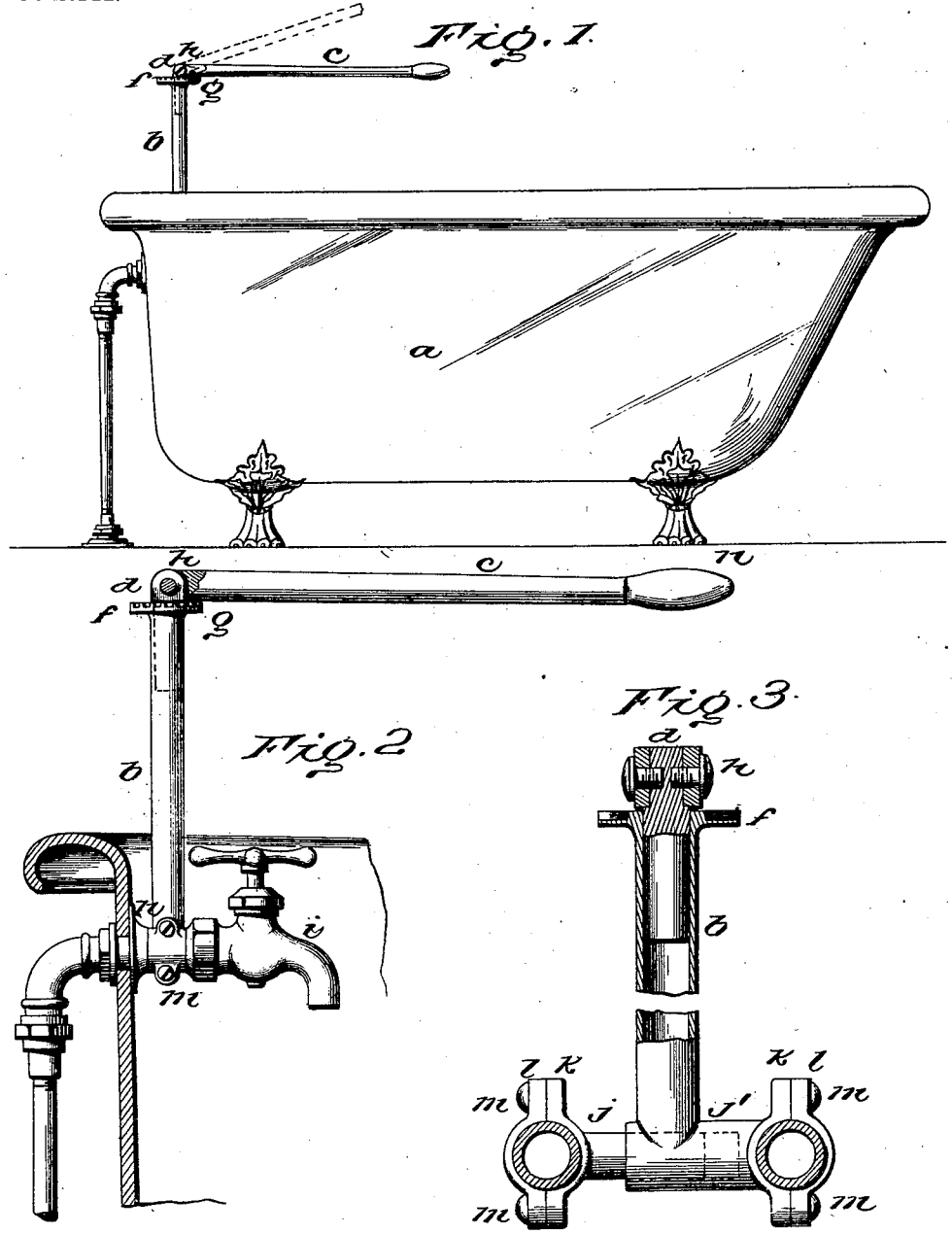
Witnesses
Florence McCall. Inventor No. 730,953. Patented June 16, 1903.

UNITED STATES PATENT OFFICE.

FLORENCE McCALL, OF WASHINGTON, DISTRICT OF COLUMBIA.

SAFETY DEVICE FOR BATH-TUBS.

SPECIFICATION forming part of Letters Patent No. 730,953, dated June 16, 1903.

Application filed July 17, 1902. Serial No. 115,988. (No model.)

*To all whom it may concern:*

Be it known that I, FLORENCE McCALL, a citizen of the United States, residing at 825 Vermont avenue, Washington, in the District of Columbia, have invented certain new and useful Improvements in Safety Devices for Bath-Tubs, of which the following is a specification.

My invention relates to a safety device to be used in combination with bath-tubs of ordinary construction; and the objects of my invention are, first, to prevent accidents by falling, slipping, &c., to a person while engaged in bathing; second, to be readily attachable to any of the ordinary bath-tubs now in common use; third, to provide means whereby my safety device may be turned out of position and used as a towel or clothes rack or removed entirely at the will of the manipulator.

While my safety device may be used in combination with any bath-tub of ordinary construction, it will be found more necessary with the porcelain-lined tub on account of the danger of falling by reason of the slipperiness of its inner surface, this danger being greatly aggravated when soap is used in the bath.

Numerous accidents have occurred whereby persons have been permanently injured by falling while in the act of bathing or while endeavoring to get in or out of the tub, and the object of my invention is to prevent such accidents.

My safety device will be found to be of great service to invalids, cripples, and persons of heavy weight, providing them with a means whereby they may steady themselves while moving about in the tub and insuring safety of entrance and exit.

My invention consists of an attachment secured rigidly and adjustably to a bath-tub of any ordinary construction; and it further consists in the details of construction and arrangement for accomplishing the objects sought.

In order that those skilled in the art to which my invention appertains may know how to manufacture and fully understand its operation, I will proceed to describe it in detail, referring by letters to the accompanying drawings, in which—

Figure 1 is a view in side elevation of a bath-tub with my safety device attached thereto. Fig. 2 is a vertical horizontal section of a bath-tub, showing my safety device in position and secured to the hot and cold water pipes. Fig. 3 is a vertical and horizontal cross-section of my invention, clearly showing the means of adapting the same to the hot and cold water pipes of a bath-tub of ordinary construction.

Similar letters refer to similar parts throughout the several views of the drawings.

$a$ is a bath-tub of ordinary type.

$b$ is the vertical hollow tube of my safety device secured in upright position to the hot and cold water pipes of the bath-tub. (See Fig. 2.)

$c$ is a horizontal handle or bar pivotally secured to a pin $d$ of smaller dimensions than the cylindrical vertical tube $b$, so as to fit loosely thereinto, said hollow tube $b$ being provided on its upper end with a horizontal flange $f$ with radial teeth, said flange $f$ to receive a keeper $g$ on the lower surface of the horizontal arm $c$, so as to lock said horizontal arm in any desired position. $h$ is the pivot upon which said handle $c$ may be raised out of engagement with the horizontal flange $f$.

$i\ i$ are the hot and cold water pipes such as are used on all bath-tubs of ordinary construction.

$j$ and $j'$ are cylindrical rods with rigid lugs $k\ k$, $j'$ being hollow and of sufficient dimension to receive the solid rod $j$, allowing the latter to slide horizontally within it, so as to effect a ready and accurate adjustment by such telescoping to the hot and cold water pipes of bath-tubs of ordinary construction.

$l\ l$ are clamps rigidly secured in position by means of screws $m\ m$. (See Figs. 2 and 3.)

Each of the outer faces of the lugs $k\ k$ and the inner faces of the clamps $l\ l$ are formed half-cylindrical, which when secured in position form a complete cylinder around the hot and cold water pipes, thereby not only holding my safety device in rigid position, but making it possible to readily adjust the same to the water equipment of all ordinary bath-tubs.

$n$ is a handhold of comfortable proportion.

The vertical cylindrical tube $b$, before referred to, is rigid with the hollow horizontal rod j'. (Clearly shown in Fig. 3.)

The dotted lines in Fig. 1 show how the horizontal bar or handle can be raised on its pivot h, so as to throw it in or out of engagement with the horizontal flange on the top of the vertical cylindrical tube. A convenient method of disposing of said horizontal rod or handle when it is not being used by the bather as a means of steadying himself in the tub is to turn it to any desired angle and use it as a towel or clothes rack.

My invention may be composed of any suitable material; but I do not limit myself to any specific material in its construction.

I have specifically described my safety device as most readily secured to the hot and cold water pipes of a bath-tub of ordinary construction and such as are already installed and in use; but it is obvious that I may provide other means of readily securing my safety device to bath-tubs of new construction without departing from the spirit of my invention.

What I claim as new, and desire to secure by Letters Patent of the United States, is—

1. A safety device for bath-tubs comprising an upright provided at its upper end with a horizontal flange having radial teeth on its upper surface, a pin swiveled in the upper end of the upright, a handle or bar pivoted to the upper end of the pin and adapted when brought to horizontal position to engage said teeth, and means for securing the upright to the tub, substantially as described.

2. A safety device for bath-tubs comprising an upright, a handle or bar adjustably secured at the upper end thereof, a horizontal hollow rod rigidly secured to the bottom of the upright, a second horizontal rod telescoping in the first rod, a half-clamp secured at the outer end of each horizontal rod adapted to engage respectively the hot and cold water pipes, and attachable half-clamps adapted to coöperate with the attached half-clamps, substantially as described and for the purposes set forth.

3. A safety device for bath-tubs comprising an upright, a bar or handle swiveled to the upper end thereof and provided with means for adjusting it horizontally and vertically, a hollow horizontal rod rigidly attached to the lower end of the upright, a second horizontal rod telescoped in the first rod, means at the outer ends of the two horizontal rods whereby they are adapted to be secured to the hot and cold water pipes respectively, substantially as described and for the purposes set forth.

In testimony whereof I affix my signature in presence of two witnesses.

FLORENCE McCALL.

Witnesses:
J. C. ANDERSON,
E. F. ANDERSON.